UNITED STATES PATENT OFFICE.

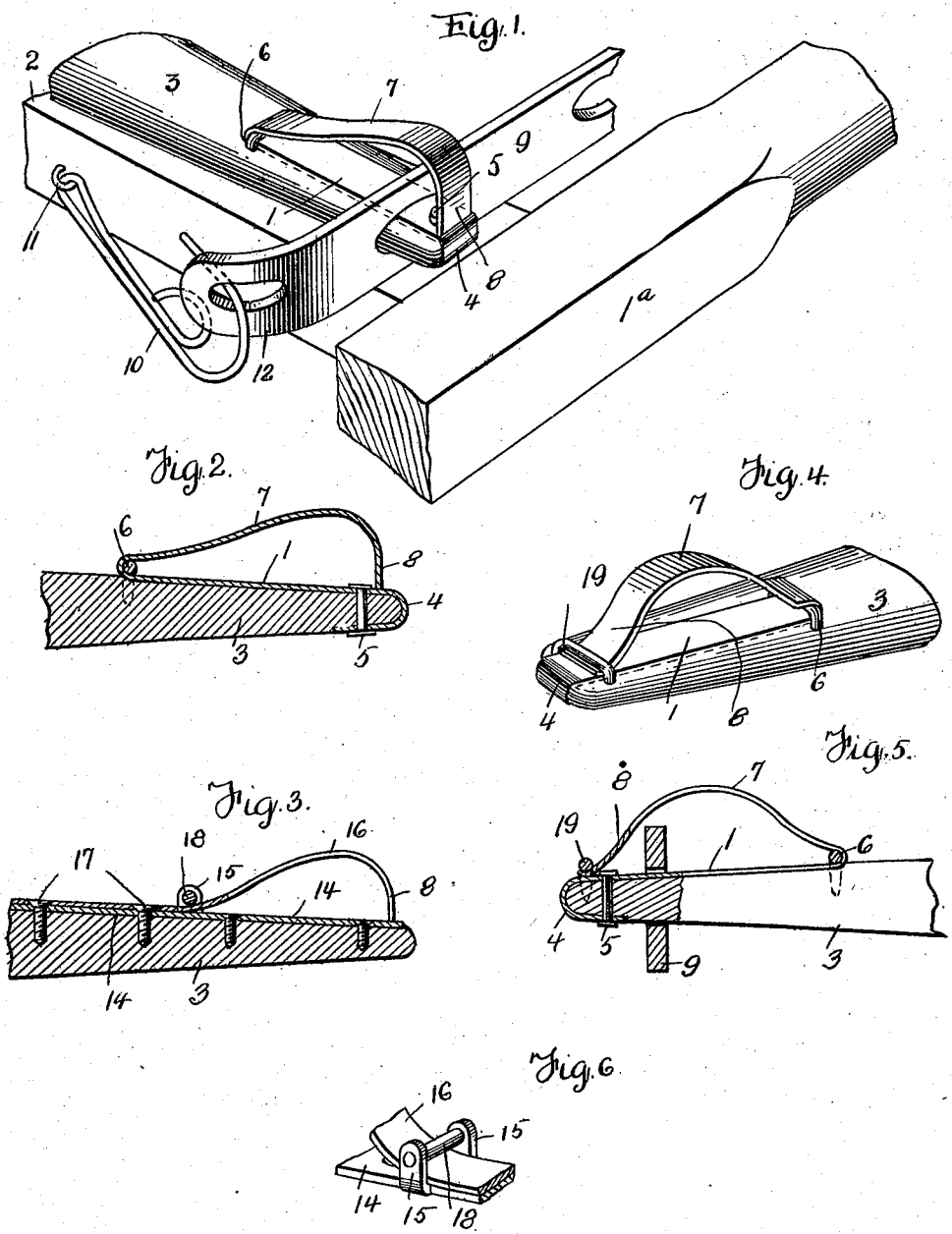

ABELARD VINCENT CUNNINGHAM, SR., OF ZELIENOPLE, PENNSYLVANIA.

TUG AND TRACE FASTENER.

No. 873,413.   Specification of Letters Patent.   Patented Dec. 10, 1907.

Application filed June 24, 1907. Serial No. 380,473.

*To all whom it may concern:*

Be it known that I, ABELARD VINCENT CUNNINGHAM, Sr., a citizen of the United States of America, residing at Zelienople, in the county of Butler and State of Pennsylvania, have invented certain new and useful Improvements in Tug and Trace Fasteners, of which the following is a specification, reference being had therein to the accompanying drawing.

This invention relates to improvements in a tug and trace fastener, and the invention has for its object provision of positive and reliable means for preventing a tug or trace from becoming accidentally displaced from the end of a swingletree.

Another object of this invention is the provision of novel means for preventing the end of a tug or trace from contacting with the wheel of a vehicle, thus preventing the tug or trace from being injured and dispensing with the noise incurred by the same contacting with the spokes of a wheel.

With the above and other objects in view, which will more readily appear as the invention is better understood, the same consists in the novel construction, combination and arrangement of parts to be presently described, and then specifically pointed out in the appended claims.

Referring to the drawings, Figure 1 is a perspective view of the tug and trace fastener. Fig. 2 is a longitudinal sectional view of the fastener. Fig. 3 is a similar view of a modified form of fastener. Fig. 4 is a perspective view of another modified form of fastener. Fig. 5 is a longitudinal sectional view of the same, and Fig. 6 is a perspective view of a portion of the fastener illustrated in Fig. 3 of the drawings.

In the accompanying drawings, I have illustrated a portion of a pair of shafts 1ª, the connecting bar 2 of said shafts supporting a swingletree 3. Upon the ends of the swingletree I have located my tug and trace fasteners, and I have only deemed it necessary to illustrate one of said fasteners.

The fastener is constructed of a flat resilient piece of metal 1 bent around the end of the swingletree 3, as at 4, and riveted or otherwise secured to the swingletree, as at 5. The opposite end of the piece of metal is held by a staple 6 and is bent to form a resilient arm 7 having a depending end 8 normally held in engagement with the swingletree by the resiliency of the piece of metal from which the fastener is made. The resilient arm 7 is elevated to permit of the tug or trace 9 being placed upon the end of the swingletree, and when the resilient arm is released it is adapted to engage the swingletree and retain the tug or trace 9 thereon.

In connection with the fastener, I use a hook-shaped member 10 loosely connected by a staple 11 to the rear side of the connecting bar 2, the hook-shaped member 10 being adapted to engage the end of the tug or trace 9 by hooking into one of the openings 12 of the tug or trace 9. The hook-shaped member prevents the end of the tug or trace from contacting with the wheel of the vehicle. The member 10 is preferably constructed of wire bent to the configuration shown in Fig. 1 of the drawings.

In Figs. 3 and 6 of the drawings, I have illustrated a slight modification of the fastener wherein a piece of metal 14 is secured upon the end of the swingletree 3, said piece of metal having upwardly extending pierced lugs 15. Secured to the piece of metal 14 is a resilient arm 16, screw 17 and a rod 18 passing through the pierced lugs 15 being used for this purpose. The resilient arm 16 resembles the arm 7 with the exception that the arm 16 and the plate 14 are two separate pieces, while in the preferred form they are made of one piece.

A still further modification of my invention is illustrated in Figs. 4 and 5 of the drawings, where the outer depending end 8 of the resilient arm 7 is adapted to engage under a staple 19 carried by the outer end of the swingletree 3, thus insuring a more positive lock for the arm 7.

My improved tug and trace fastener can be countersunk in the ends of the swingletree, as illustrated, whereby the metallic fastener will not injure the lower edge of the tug or trace.

Having fully described my invention, what I claim and desire to secure by Letters Patent is:

1. A tug and trace fastener comprising an elongated strip of metallic material having one end bent around and secured to the end of a swingletree, said strip having a portion of its length extending inwardly and engaging the upper face of the swingle tree and the remaining portion of its length extending outwardly and over that portion positioned against the swingle tree and constituting a spring arm, combined with means for securing to the swingle tree the inner terminus of that portion of the strip which engages the outer face of the swingle tree.

2. A tug and trace fastener comprising an elongated strip of metallic material having one end bent around and secured to the end of a swingle tree, said strip having a portion of its length extending inwardly and engaging the upper face of the swingle tree and the remaining portion of its length extending outwardly and over that portion positioned against the swingle tree and constituting a spring arm, that portion of the strip constituting a spring arm having its outer terminus bent in a curvilinear manner and with the end thereof normally engaging the outer terminus of that portion of the strip which engages the outer face of the swingle tree, combined with means for securing to the swingle tree the inner terminus of that portion of the strip which engages the outer face of the swingle tree.

In testimony whereof I affix my signature in the presence of two witnesses.

ABELARD VINCENT CUNNINGHAM, Sr.

Witnesses:
F. W. CUNNINGHAM,
GEO. KING.